Patented Apr. 22, 1930

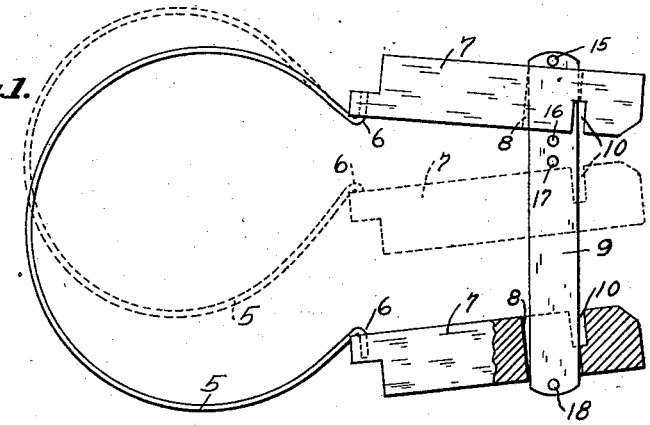

1,755,294

UNITED STATES PATENT OFFICE

RAY GROVER, OF MILWAUKEE, WISCONSIN

PISTON-RING CLAMP

Application filed October 17, 1928. Serial No. 312,977.

This invention relates to improvements in piston ring clamps.

While the device hereinafter to be disclosed may be used to facilitate the introduction of piston rings into a cylinder during assembly of an internal combustion engine or compressor, its primary function is to facilitate the manufacture of piston rings by providing an extremely thin clamp which will ordinarily not exceed the thickness of the ring with which it is engaged and which may be adjusted with great facility to and from clamping position and will serve when clamped to flexibly maintain the ring closed to the form of a true circle.

One method of manufacturing piston rings involves the making of roughly eliptical castings, the transverse cutting of each casting to the form of a split ring, the machining of the ends of the ring to provide the necessary degree of overlap and the joint if any, and the subsequent compression of the ring to close its joint and permit of a final machining or grinding operation by which the exterior periphery of the ring when closed may be made truly circular. It will be understood that the original elliptical form of the annulus is necessary in order to provide that surplus of material which is removed in the machining of the joint between the split ends.

This invention has to do particularly with the step of clamping the ring for its final machining or grinding to circular form. If a rigid clamp is used to close the ring for this operation its jaws may engage high spots in the periphery of the ring, thereby leaving the ring distorted at the time the grinding is performed. This will result in further distortion when the clamping pressure is relieved following the grinding operation. It is, therefore, one of the purposes of this invention to provide a clamp in which the ring engaging member is resilient and will accommodate itself to any irregularities existing in the peripheries of the ring.

One of the easiest ways of performing the grinding operation is to mount the ring upon a mandrel, with a large number of other rings, all of which are clampingly bound into axial face engagement under pressure sufficient to maintain the rings closed even after their individual clamps are released, thus enabling the grinding operation to be carried on upon a composite cylindrical body made up of the individually compressed rings. In order that the rings may be individually compressed while in face contact with each other it is important that the clamp employed should be extremely thin so that it preferably does not exceed the ring itself in thickness. To accomplish this desirable result is another of the objects of this invention.

The number of clamps which must be engaged disengaged in each such operation corresponds to the number of rings upon which the operation is conducted. It is extremely desirable therefore that the clamps should not only be cheap in themselves but should be so easily manipulated that they can be handled with great expedition.

It is one of the objects of the invention to provide a clamp which has an infinite number of adjustments instantly controlled as to clamping action by the mere pressure of the thumb and finger of the workman and instantly releasable in large quantities through the action of a bar or rod which may be moved to engage the releasing portions of a large number of clamps simultaneously. It is therefore my purpose to provide for this facility of individual operation to clamping position and gang release.

It will be observed by those skilled in the art that all of the above objects have to do not only with speed and economy in the manufacture of piston rings but also with accuracy. It has been demonstrated that rings made through the use of the clamp hereinafter disclosed may be kept in commercial production to accuracy within two one-thousandths of an inch, whereas the average ring otherwise produced with no less effort has only been accurate to about eight one-thousandths of an inch.

In the drawings—

Figure 1 is a side elevation of a clamp embodying this invention showing a portion of one of the clamping members broken away to expose the mounting thereof;

Figure 2 is a similar view showing the clamp applied to a piston ring;

Figure 3 is a plan or edge view of the clamp applied to a piston ring as in Figure 2.

Like parts are identified by similar reference characters throughout the several views.

The device comprises simply a clamping ring 5 anchored at its ends 6 in the ends of the thin arms or levers 7 which may comprise handles for the operation of the tool. These arms or handles are correspondingly slotted at 8 to receive loosely the links or tie bar 9 and are provided at 10 with notches intersecting the slots 8 to limit the cross-sectional dimension of each arm or handle 7 with the tie bar 9 at the point of engagement therewith.

The link 9 is preferably fixed loosely with reference to one of the handles or arms which may be termed the "first arm" 7 by means of punch pricks 15 and 16 or other suitable means. The other handle or arm 7 which may be termed the "second arm" is free to move practically the entire remaining length of tie link 9 between punch pricks 17 and 18 which determine its full line and dotted line positions, as illustrated in Figure 1.

The wire clamping member used at 5 is resiliently flexible and tends to maintain the parts in the full line positions of Figure 1. Its engagement with first arm 7, however, is such that it tends to maintain such levers tilted to the full extent permitted by the loose engagement of the link 9 in the slots 8. The width of the arms as limited by notches 10 is such that this tilting action results in cramping each arm into very tight frictional engagement with the link 9 whereby each arm will tend to resist movement along the link in a direction tending to separate the arms. It is possible therefore to tighten the clamp upon a piston ring 20 to engage it upon a mandrel such as that shown at 21 in Figure 2 merely by such pressure as may be exerted by the thumb and forefinger of the operator upon the outer margins of the arms 7 but, notwithstanding the slight pressure required to accomplish the clamping engagement of the tool, it will nevertheless lock itself in any position to which it may be adjusted, to resist any movement tending to disengage the clamp. The tool will, therefore, remain indefinitely in clamping engagement, as shown in Figure 2.

Figure 3 illustrates several rings in mutual face contact interposed between the clamping heads 22 and 23 and there held pending release of the individual clamps. It will be noted that the clamp is thinner than the individual ring with which it is engaged thereby permitting any number of rings to be thus held between the pressure heads 22 and 23 without interference between the adjacent tools herein disclosed.

It is particularly to be observed that nothing is required for the release of the device from its Figure 2 position other than the introduction between the entire series of clamps of any means which will tend to adjust the lever arms 7 toward positions of parallelism, which will release their cramping upon bar 9 and therefore permit their movement in a direction of separation. Such a means may comprise for example a blunt wedge such as that illustrated at 25 in Figures 2 and 3 and which may be introduced between the free ends 26 of arms 7 to force them toward positions of parallelism and thereby release them from their respective engagements with the bar.

Since the tool herein disclosed is flexible and no thicker than the ring, since it is readily manipulated to any desired one of an infinite number of clamping positions within its range of operation, and since it is not only adapted for instantaneous release as an individual clamp but may be released in multiples or gangs if desired, it will be apparent to those skilled in the art that this device satisfies the objects of the invention as hereinbefore specified.

I claim:

1. The combination with a ring encircling clamp, of clamp operating means comprising a first arm connected with said clamp, a link connected with said first arm, and a second arm connected with said clamp and adjustable upon the link.

2. The combination with a ring encircling clamp, of a link connected with one end thereof and a lever connected with the other end of said clamp and slidably adjustable upon said link.

3. The combination with a ring encircling clamp, of a link connected with one end thereof and a lever connected with the other end of said clamp and slidably adjustable upon said link, said lever being formed to engage said link between opposing surfaces, of which one is of sufficiently short extent to permit said lever to be cramped upon said link upon manipulation to an angular position with respect thereto.

4. The combination with a ring encircling clamp, of a link connected with one end thereof and a lever connected with the other end of said clamp and slidably adjustable upon said ring, said lever being formed to engage said link between opposing surfaces, of which one is of sufficiently short extent to permit said lever to be cramped upon said link upon manipulation to an angular position with respect thereto, said clamp being resiliently adapted to tilt said lever upon said link whereby said lever will tend to retain any position of clamping engagement to which it is adjusted.

5. The combination with a ring encircling clamp, of a link flexibly connected to one end thereof, an arm loosely fitted to said link for sliding movement thereon and adapted to be tilted with reference thereto for cramping engagement therewith, said lever being connected with the other end of said clamp and said clamp being resiliently flexible whereby to be adapted to accommodate itself to the periphery of a ring engaged by it while acting upon said lever in a direction to cramp it upon said link in opposition to movement tending to release said clamp.

6. The combination with a flexible clamp adapted to encircle a ring, of a link provided with an arm engaging one end of said clamp, a lever provided with an apertured portion loosely slidable upon said link and connected with said clamp for manipulation thereof and subject to thrust thereof tending to cramp the margin of said apertured portion upon said link in a direction tending to maintain said lever in any clamping position to which it is adjusted thereon, the end of said lever being extended beyond said link and adapted to receive pressure tending to restore it to a position for sliding movement thereon.

7. The combination with a flexible clamp, of a link, a pair of arms connected with said link and with said clamp, one of said arms being adjustable upon said link and adapted under the resistance of said clamp to be cramped upon said link in any position to which it is adjusted, each of said arms being extended beyond said link and provided with portions subject to manipulation in directions tending to make said arms parallel whereby to permit the sliding of said last mentioned arms to clamp releasing position upon said link.

8. The combination with a ring encircling clamp of flexible material, of a pair of thin arms connected with the ends of said clamp and disposed in the plane thereof, each of said arms being slotted parallel to said plane, and a thin link bar extending through the slots of said arms and loosely connected to one thereof, the other arm being subject to manipulation upon the bar and adapted under the resistance of said clamp to engage said bar with a cramping action in any clamp engaging position to which it is adjusted upon the bar.

9. The combination with a flexible clamp adapted to encircle a piston ring, of a thin arm disposed in the plane of the clamp and connected to one end thereof, said arm being slotted parallel to the plane of the clamp, a link extending through the slot of said arm and loosely subject to manipulation in said slot whereby said arm may be cramped upon said link, and means connecting said ring with the other end of said clamp; said clamp, said arm, said link, and said means being of no greater thickness than a ring adapted to be engaged by said clamp.

10. The combination with a flexible clamp, of a link connected with one end thereof and a transversely slotted arm connected with the other end thereof and slidable upon the link, said arm being provided with a notch intersecting its slot whereby to reduce its cross-sectional dimension at the point of engagement with the link and to facilitate cramping of the said lever upon the link.

RAY GROVER.